Nov. 22, 1927.
W. E. SROTE
1,650,545
TRANSMISSION
Filed Dec. 27, 1926
3 Sheets-Sheet 1
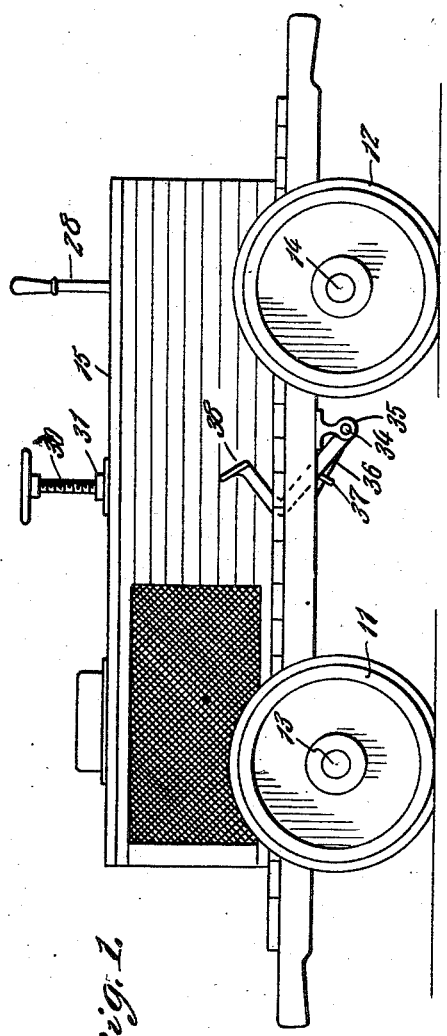
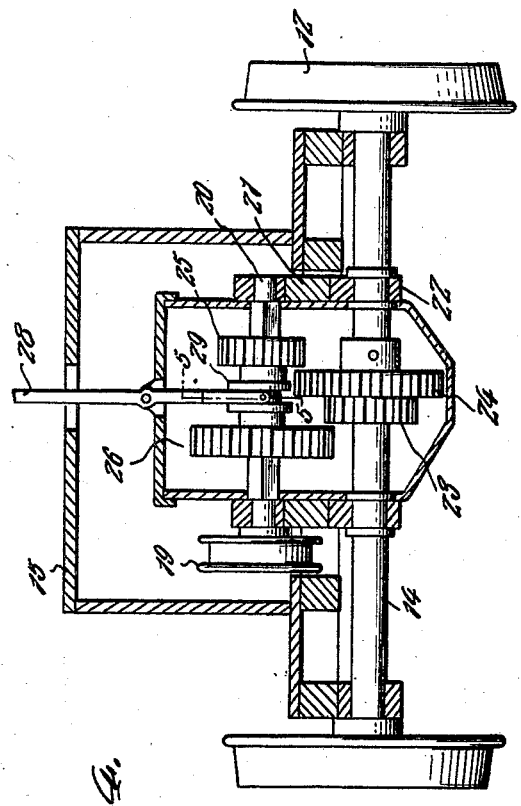
W. E. Srote, INVENTOR
BY Victor J. Evans, ATTORNEY

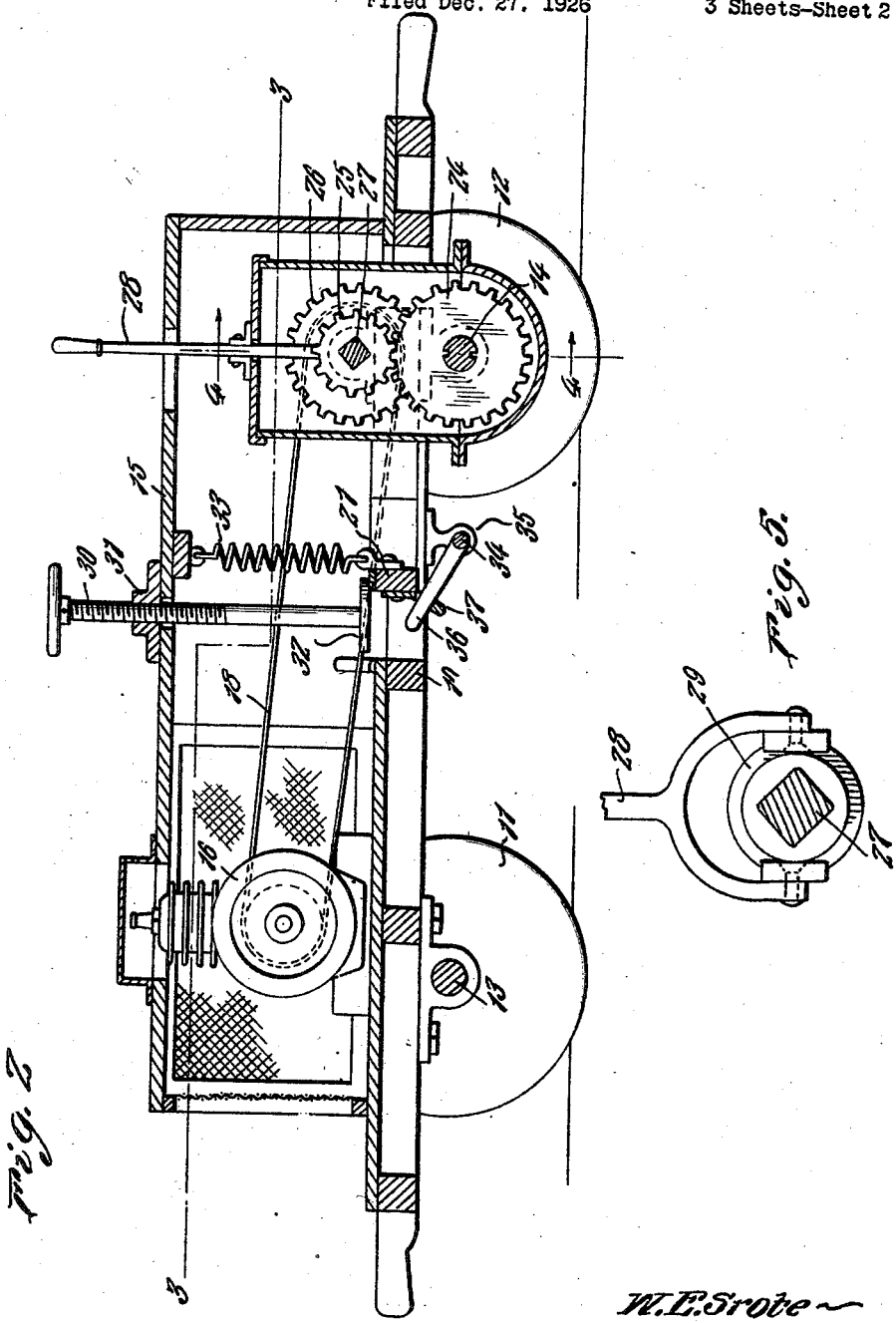

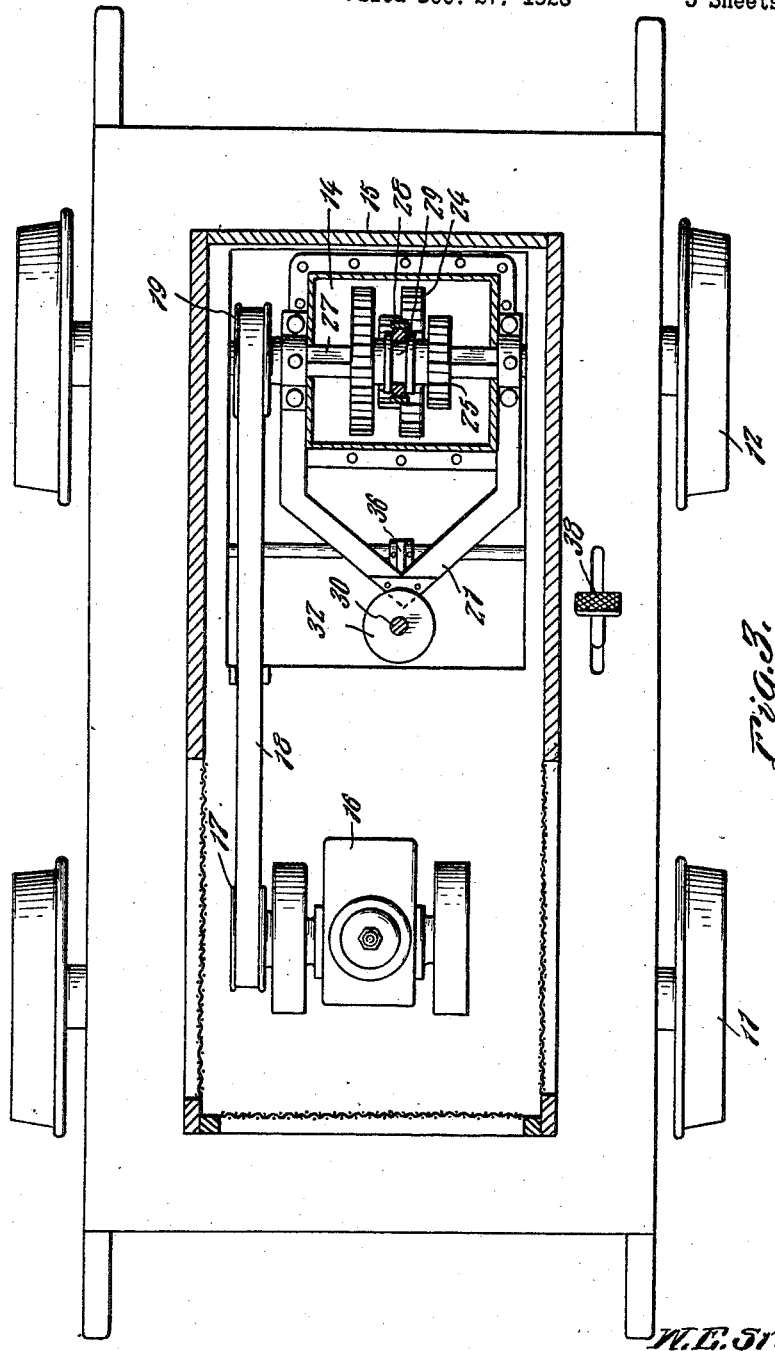

Patented Nov. 22, 1927.

1,650,545

UNITED STATES PATENT OFFICE.

WILLIAM E. SROTE, OF TUCUMCARI, NEW MEXICO.

TRANSMISSION.

Application filed December 27, 1926. Serial No. 157,373.

This invention relates to railroad cars of the type usually employed by employees of the company as a medium of transportation to and from work, and has particular reference to a transmission structure therefor.

It is the object of the present invention to provide a transmission mechanism for cars of the above mentioned character having several speeds forward, with the transmission gears mounted on a floating frame capable of being actuated to facilitate shifting of the transmission gears as the occasion requires, and at the same time to reduce the speed of the car by loosening the driving belt connection between the motor and transmission when desirable.

The nature and advantages of the invention will be better understood when the following detail description is read in connection with the accompanying drawings, the invention residing in the construction, combination, and arrangement of parts as claimed.

In the drawings forming part of this application like numerals of reference indicate similar parts in the several views and wherein:

Figure 1 is a side elevation.

Figure 2 is a vertical sectional view.

Figure 3 is a sectional view on line 3—3 of Figure 2.

Figure 4 is a sectional view on line 4—4 of Figure 2.

Figure 5 is a sectional view on line 5—5 of Figure 4.

Referring to the drawings in detail 10 indicates the wheel frame of the car, the front and rear wheels being indicated at 11 and 12 respectively, the axles therefor being indicated at 13 and 14 respectively. Mounted on the frame 10 is a deck or superstructure indicated generally at 15, and in which is arranged a suitable motor 16 equipped with a pulley 17 over which is trained an endless belt 18. This belt is also trained over a similar pulley 19 mounted upon the transmission shaft 20, the latter being journaled in a floating frame 21 which is pivoted as at 22 upon the rear axle 14 as clearly illustrated in Figure 4. This axle supports high and low speed gears 23 and 24 respectively, while similar gears 25 and 26 are mounted upon the transmission shaft 20. These gears are mounted to slide in unison along the shaft 20, the intermediate portion of which is squared in cross section as clearly indicated at 27 in Figure 5. The gears are actuated by a gear shift lever 28 connected in the ordinary well known manner with the collar 29. In Figure 4 I have shown the neutral position of these gears, wherein it will be noted that the gears 25 and 26 are arranged at opposite sides of the gears 23 and 24, and that the lever 28 can be conveniently operated to cause the gears 23 and 26 respectively to mesh with each other, or the gears 24 and 25 to mesh with each other. When either set of gears are operatively associated, the car is propelled by the motor 16 through the instrumentality of the endless belt 17.

By mounting the transmission shaft 20 on the floating frame 21, it is possible to manipulate this frame to move the gears 25 and 26 either forwardly or rearwardly of the axle 14, with a view of tightening or loosening the endless belt 18 as the occasion may require. In other words if it is desired to reduce the speed of the car, the belt 18 can be loosened to the desired degree, by simply lowering one end of the floating frame 21, which moves the gears on the transmission shaft 20 slightly to one side of the axle 14.

For this purpose I employ a screw shaft 30 which is threaded through a nut or bushing 31 on the top of the deck or superstructure 15, the lower end of this shaft supporting a large disk 32 which reposes upon the adjacent end of the frame 21. A coil spring 33 is also connected with this end of the frame and with the deck or superstructure 15, and functions to normally hold the frame in its horizontal position. Manifestly by turning the shaft 30 in a direction to lower the disk 32, the latter pushes downwardly upon the adjacent end of the floating frame 21 for the purpose above stated. Should it be desired to tighten the belt 18, the shaft 30 would be rotated in an opposite direction, thereby allowing the spring 30 to move the adjacent end of the floating frame 21 upwardly. This of course would shift the gears on the transmission shaft in a direction rearwardly of the axle 14 until the belt 18 was sufficiently tight.

It might be desirable to loosen the belt 18 just prior to shifting the gears 25 and 26 to change the speed of the car, and for this purpose I have provided a foot actuated means for operating the floating frame independently of the shaft 30. This means comprises a rock shaft 34 journaled in suitable bearings 35 on the under side of the car, and which shaft is provided with an extension or arm 36 received by a bracket 37 depending from the adjacent end of the floating frame 21. The shaft 34 is equipped with a foot pedal 38, and it is manifest that when this pedal is depressed, the shaft 34 is rocked causing the arm or extension 36 to pull the adjacent end of the frame 21 downwardly against the tension of the spring 23, thereby loosening the belt 18. After the gears have been shifted it is only necessary to remove the foot from the pedal 38, and thereby allow the spring 33 to return the frame 20 to its normal position with a resultant tightening of the belt.

While it is believed that from the foregoing description, the nature and advantages of the invention will be readily apparent, I desire to have it understood, that I do not limit myself to what is herein shown and described and that such changes may be resorted to when desired as fall within the scope of what is claimed.

What is claimed is:

1. In a motor operated car, an axle, variable speed gears mounted thereon, a floating frame, a transmission shaft journaled on said frame, similar gears carried by said shaft and adapted to be shifted into mesh with the corresponding gears on the axle, and means for imparting pivotal movement to said frame prior to shifting the gears mounted thereon into and out of engagement with the gears on said axle.

2. In a motor operated car, an axle, variable speed gears mounted thereon, a pivotally mounted frame, a transmission shaft journaled thereon, similar gears carried by said shaft and adapted to be shifted laterally into engagement with the corresponding gears on the axle, foot operated means for moving said frame prior to shifting the gears mounted thereon into and out of engagement with the gears on said axle, and resilient means for returning said frame and its gears to normal position upon release of the foot actuated means.

3. In a motor operated car, an axle, variable speed gears mounted thereon, a pivotally mounted frame, a transmission shaft journaled thereon, similar gears carried by said shaft, means for shifting said last mentioned gears into and out of engagement with the corresponding gears on the axle, an endless belt for driving the transmission shaft from the motor, and manually operable means for adjusting the frame for tightening or loosening the belt for the purpose specified.

4. In a motor operated car, an axle, variable speed gears mounted thereon, a pivotally mounted frame, a transmission shaft journaled thereon, gears carried by said shaft and adapted to be shifted into and out of engagement with the gears on said axle, pulleys mounted on the motor and transmission shafts respectively, an endless belt trained over said pulleys, yieldable means connected with said frame, and means for adjusting said frame against the tension of said means to loosen said belt for the purpose specified.

5. In a motor operated car, an axle, variable speed gears mounted thereon, a pivotally mounted frame, a transmission shaft journaled thereon, gears carried by said shaft and adapted to be shifted into and out of engagement with the gears on said axle, pulleys mounted on the motor and transmission shafts respectively, an endless belt trained over said pulleys, yieldable means connected with said frame, means for adjusting said frame against the tension of said means to loosen said belt, and foot actuated means for moving said frame in the same direction independently of the aforementioned means.

In testimony whereof I affix my signature.

WILLIAM E. SROTE.